(12) United States Patent
Fernald et al.

(10) Patent No.: US 11,060,165 B2
(45) Date of Patent: Jul. 13, 2021

(54) SEPARATION OF COPPER AND MOLYBDENUM SULFIDES FROM PYRITE USING A SEA WATER/DESALINATED WATER HYBRID PROCESS

(71) Applicant: CiDRA Corporate Services LLC, Wallingford, CT (US)

(72) Inventors: Mark A. Fernald, Enfield, CT (US); Paul J. Rothman, Windsor, CT (US); Peter A. Amelunxen, Colebay (SX)

(73) Assignee: CIDRA CORPORATE SERVICES, INC., Wallingford, CT (US)

( * ) Notice: Subject to any disclaimer, the term of this patent is extended or adjusted under 35 U.S.C. 154(b) by 56 days.

(21) Appl. No.: 16/339,546

(22) PCT Filed: Oct. 4, 2017

(86) PCT No.: PCT/US2017/055072
§ 371 (c)(1),
(2) Date: Apr. 4, 2019

(87) PCT Pub. No.: WO2018/067657
PCT Pub. Date: Apr. 12, 2018

(65) Prior Publication Data
US 2020/0040428 A1 Feb. 6, 2020

Related U.S. Application Data

(60) Provisional application No. 62/405,569, filed on Oct. 7, 2016.

(51) Int. Cl.
| | | |
|---|---|---|
| *B03D 1/02* | (2006.01) | |
| *B03D 1/06* | (2006.01) | |
| *C22B 15/00* | (2006.01) | |
| *B03D 1/004* | (2006.01) | |
| *B03D 1/08* | (2006.01) | |
| *B03D 1/14* | (2006.01) | |
| *C22B 34/34* | (2006.01) | |

(52) U.S. Cl.
CPC ........ *C22B 15/0071* (2013.01); *B03D 1/0046* (2013.01); *B03D 1/023* (2013.01); *B03D 1/087* (2013.01); *B03D 1/1475* (2013.01); *C22B 34/34* (2013.01); *B03D 1/02* (2013.01); *B03D 1/06* (2013.01); *B03D 2203/025* (2013.01)

(58) Field of Classification Search
CPC .... B03D 1/0046; B03D 1/087; B03D 1/1475; B03D 1/023; B03D 2203/025; C22B 15/0071; C22B 34/34
USPC .............. 209/168–170, 164–167, 45, 47, 49
See application file for complete search history.

(56) References Cited

U.S. PATENT DOCUMENTS

| | | |
|---|---|---|
| 4,192,851 A | 3/1980 | Hirsch et al. |
| 4,634,467 A | 1/1987 | Ochs |
| (Continued) | | |

*Primary Examiner* — Thomas M Lithgow
(74) *Attorney, Agent, or Firm* — Ware, Fressola, Maguire & Barber LLP

(57) ABSTRACT

A copper/molybdenum separation system uses sea water in the roughing circuit and desalinated water in cleaning circuit. In both roughing circuit and cleaning circuit, hydrophobic engineered media are used to recover the mineral particles of interest. The cleaning circuit includes a molybdenum loading stage configured to contact the conditioned pulp with the engineered media in an agitated reaction chamber, and load the hydrophobic molybdenite on the engineered media.

3 Claims, 12 Drawing Sheets

(56) References Cited

U.S. PATENT DOCUMENTS

| | | | |
|---|---|---|---|
| 8,440,727 B2* | 5/2013 | Gradek | C10G 25/12 |
| | | | 516/136 |
| 2014/0183104 A1* | 7/2014 | Rothman | B07B 1/00 |
| | | | 209/168 |
| 2014/0197077 A1* | 7/2014 | Rothman | B04C 1/00 |
| | | | 209/163 |
| 2016/0114336 A1 | 4/2016 | Allen et al. | |
| 2016/0199854 A1 | 7/2016 | Gorain | |
| 2017/0158976 A1 | 6/2017 | O'Rear et al. | |

\* cited by examiner

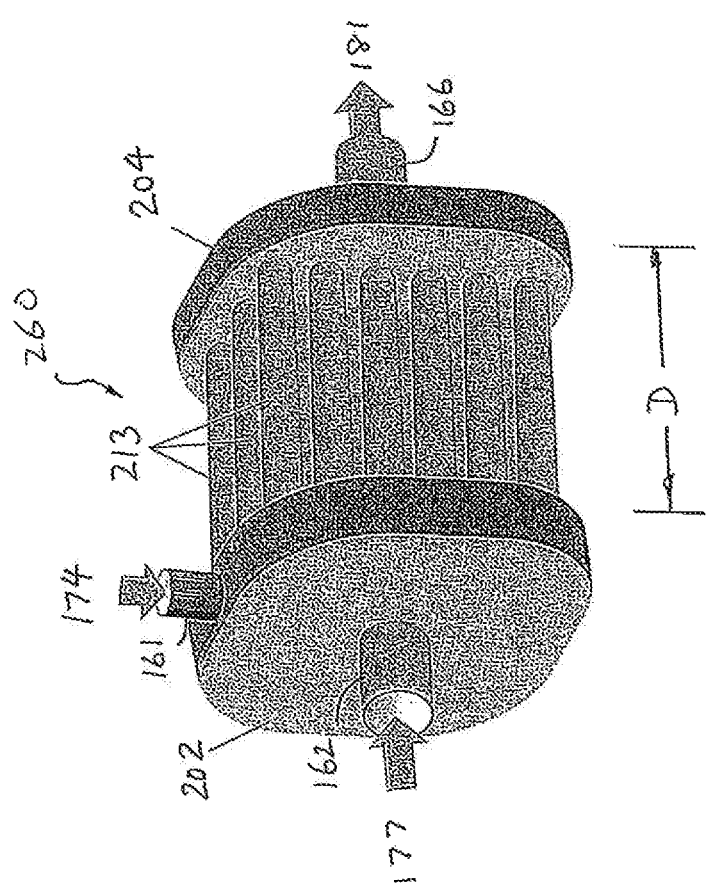

SEPARATION OF COPPER AND MOLYBDENUM SULFIDES FROM PYRITE USING A SEA WATER/DESALINATED WATER HYBRID PROCESS

CROSS-REFERENCE TO RELATED APPLICATIONS

This application corresponds to international patent application no. PCT/US17/55072, filed 4 Oct. 2017, which claims benefit to provisional patent application Ser. No. 62/403,837, filed 4 Oct. 2016; and provisional patent application Ser. No. 62/405,569, filed 7 Oct. 2016, entitled "Three dimensional functionalized open-network structure for selective separation of mineral particles in an aqueous system," which are all hereby incorporated by reference in its entirety.

BACKGROUND OF THE INVENTION

1. Technical Field

This invention relates generally to a method and apparatus for recovering valuable material in a mixture, such as a slurry mixture.

2. Brief Description of Related Art

The global annual molybdenum consumption and production is currently estimated at around 530 million contained pounds of molybdenum (2014 figures), of which approximately 400 million are destined for the metallurgical industry (steel, stainless steel) and the other 130 million are sold in the chemical market (hydrodesulfurization catalyst, paints, lubricants).

Most copper sulfide concentrates are produced from low grade porphyry ore bodies using a series of crushing, grinding and flotation steps. The ore is first crushed and ground to achieve a consistently fine sandy texture (particle sizes up to about 300 microns) and then subjected to a bulk "rougher" flotation step in which all of the sulfides are recovered, including any sulfide impurities such as pyrite. During this step a large portion of the original ore is rejected to tailings. The smaller mass of rougher concentrate is then subjected to further grinding (termed "regrinding") and lime and/or reagent collectors and depressants are added to depress the pyrite, gangue, and any other minerals or elements that are not desired in the final product. The amount of regrinding depends on the mineralogical properties of the minerals of interest.

During the cleaner flotation step, it is sought to recover the molybdenite to the sulfide concentrate and then remove it in a subsequent selective flotation step. The sulfide concentrate containing the copper and the molybdenum sulfide minerals is termed the "bulk sulfide concentrate" or "Cu/Mo concentrate". The subsequent selective flotation step, in which the molybdenite is floated and the copper sulfides are depressed, is termed "Cu/Mo separation" or just "molybdenum separation". The process consists of depressing the copper sulfide minerals by adding a depressant, almost always consisting of sodium hydrosulfide (NaHS) in solution, to reduce the oxidation-reduction potential of the pulp to extremely negative values, thus creating a reducing environment and rendering the copper sulfide minerals hydrophilic. It is beneficial to remove as much of the copper collectors from the slurry stream as possible, and this is done in a thickening (settling) step prior to addition of NaHS.

Because the copper sulfides and other minerals have been reground in the preceding steps, the particles are very fine and readily amenable to hydraulic entrainment. Hydraulic entrainment is the undesirable recovery of hydrophilic particles to the concentrate, due to the physical drag imparted by the water that is naturally recovered with the froth. Because of the large degree of entrainment in copper/moly separation, a second "cleaning" circuit is required to treat the moly rougher concentrate, in order for these entrainment impurities to be removed from the molybdenum concentrate.

In many traditional fresh water copper/molybdenum flotation circuits, lime and pH are used to control the selectivity of the process. It is known that the separation efficiency of a given mineral is a strong function of pH, and the optimum pH is different for each mineral. This phenomena is taken advantage of to design a circuit that can selectively recover the valuable minerals (such as chalcopyrite, bornite, and molybdenite) while depressing the undesirable sulfide minerals (such as pyrite). For example, in a traditional copper/molybdenum roughing circuit, xanthate collectors are added to render the sulfide minerals hydrophobic, and they are first floated in a pH 9 to 10.5 system in order to recover all of the sulfides. These concentrated sulfides from the roughing circuit are then reground to achieve additional liberation, treated with lime to increase the pH, and then refloated in a higher pH system. Because pyrite begins to lose hydrophobicity above pH 10.5, this so-called "cleaner circuit" selectively recovers the copper and molybdenum minerals to a "bulk copper-molybdenum concentrate" while rejecting the pyrite to the "cleaner tails", which is usually dewatering and directed to the tailings impoundment facility. This cleaner tails stream is therefore high in pyrite, because it contains all of the pyrite that was recovered in the roughers, but rejected in the cleaners.

The bulk copper-molybdenum concentrate produced in the cleaner circuit is then directed to yet a third flotation circuit, in which the copper sulfides are depressed using sodium hydrosulfide solution, and the molybdenum mineral is thereby selectively recovered to a molybdenum concentrate, which is dewatered, filtered, and shipped to a roaster. The rejected copper sulfides are dewatered, filtered, and shipped to the smelter.

In arid regions, such as the Atacama Desert of Northern Chile and Southern Peru, a scarcity of fresh water is driving the industry to use sea water for the flotation separation of the valuable sulfide minerals. This creates a challenge, because the salts in untreated sea water, particularly those of magnesium and calcium, combined with the well-known pH buffering effect of sea water, effectively constrain the use of lime to depress pyrite. In this so-called buffering phenomenon at pH above approximately 9.5, the lime begins to react with the dissolved salts, forming solid hydrophilic precipitate on the valuable sulfide minerals and thereby reducing the ability to separate them by froth flotation. As a result, there is a need for alternative pyrite depressants, and more selective sulfide flotation collectors, such that an effective separation of pyrite from copper and molybdenum sulfides can be achieved without excessive lime consumption, or without relying on strongly alkaline flotation system (meaning a pH greater than about 9.0).

One common solution is to use a metabisulfite (MBS) such as sodium (NaMBS) or potassium metabisulfite (KMBS) to depress pyrite in the cleaner flotation stage at pH below 9.0. Examples of mining operations that have pursued this solution include the Centinela and the Sierra Gorda operations near Calama, Chile. FIG. 1 shows a typical process.

While the kind of flotation process as shown in FIG. 1 is an improvement relative to the sea water, xanthate, and lime system, it has other drawbacks, namely:

1. The sodium or potassium metabisulfite is required in relatively large quantities, and it is relatively expensive. Safety and environmental permits for the use of such reagents can also be restrictive.

2. The highly selective (against pyrite) reagents that are used for these systems are less efficient than the xanthate and fresh water systems, and they often still allow for significant pyrite recoveries to the economic products in order to not significantly impact the copper and molybdenum recoveries. The increased pyrite recovery often results in concentrate grade dilution, yielding higher concentrate shipping costs and reduced payment premiums from the smelter. In some cases, they have been shown to also depress some of the desirable byproduct minerals, such as molybdenite.

3. The use of metabisulfite for the separation of copper/molybdenum from pyrite is restricted.

4. The salt in the sea water can cause extensive corrosion at the process facility if care is not taken. The corrosion and chloride ion mitigation plan is usually quite expensive, as it requires the use of special paints, liners, anticorrosion additives, and other materials, processes, and practices.

The above challenges are so significant that many mining installations are pursuing an alternative solution. This consists of installing reverse osmosis desalination plants near the coast and pumping the desalinated water to the process facilities for use in the entire flotation process. Because the desalinated water is free of calcium, magnesium and other detrimental salts, traditional xanthate and lime flotation chemistry can be used. Examples of mining operations that have pursued the desalination solution include BHP's Escondida mine, Lundin's Candelaria plant, and various others, both in operation and under development.

The desalination route described above is presented in FIG. 2. This approach also presents disadvantages. The large reverse osmosis desalination plants are very expensive, and often require hundreds of millions of dollars to build. They are also costly to operate, requiring as much as 5 to 7 kWh per cubic meter of water produced. Furthermore, it can also be difficult to acquire an adequate plant location site due to the scarcity of coastal land resources with the necessary qualities and accessibility. Lastly, there can be complications with the environmental permitting requirements, because they need various water treatment chemicals to minimize corrosion, and they also produce a super-saturated saline discharge stream, which must be either discharged to the sea or treated through an expensive evaporative disposal process.

SUMMARY OF THE INVENTION

According to some embodiments of the present invention, the present invention may take the form of a circuit having a roughing stage and a cleaning stage. In the roughing stage, sea water is used to mix with the ground ore in the comminution step to form a slurry. Xanthate collectors are added to the slurry to render the sulfide minerals hydrophobic. The slurry containing sulfide minerals is processed with engineered collection media or collection surfaces having a hydrophobic coating to attract the sulfide minerals. In the cleaning stage, desalinated water is used at the moly plant stage.

The circuit consists of a bulk rougher separation stage that uses solid media separation technology in a low pH, sea water flotation system to recover the sulfide minerals of copper, molybdenum and iron. The roughing circuit operates with saline process water and a sea water makeup stream. The solid media roughing circuit—which includes extraction, stripping, and filtration stages—produces a low-moisture sulfide concentrate containing mainly pyrite, copper sulfides, molybdenum sulfides, and minor amounts of locked gangue. Because the solid media circuit produces a concentrate that is virtually free of entrained fine particles, the concentrate is both lower in mass and higher in bulk porosity than a traditional rougher concentrate produced via froth flotation. This significantly reduces the water content of the filter cake, the volume of solids that must be filtered, and the operating and capital cost of the filtration stage (relative to traditional froth flotation).

The filtered roughing circuit concentrate is then directed to a cleaner circuit that is operated with desalinated process water. It is re-pulped using a desalinated stream produced by small, locally installed reverse osmosis plant. Because the resulting slurry is salt-free, the traditional xanthate and lime flotation chemistry can be used without interference from salt precipitates. A dedicated cleaner tails thickener is used to recover the desalinated water from the cleaner tails and recycle it to the desalinated cleaning process. Optionally, the thickener underflow is filtered to recover even more water, further reducing the desalinated water requirements and therefore the size of the reverse osmosis plant.

As already noted, the concentrates of the rougher flotation are much lower in gangue mineral content and much higher in pyrite content than those produced by traditional froth flotation. This means that the cleaner tails will also be higher in pyrite grade. This makes it much easier and more economical to manage, either through dedicated impoundment or remediation ponds, as pyrite augmentation to existing copper heap leach systems, or as a standalone byproduct (for example, to produce iron, sulfuric acid, or to recover refractory gold values via a roaster or autoclave circuit). In other words, the current invention improves the prospects of converting what is a liability in the case of the conventional circuit (because of the possibility of uncontrolled acid generation) into a potential asset or revenue stream.

Thus, an aspect of the present invention is a copper/molybdenum processing system, comprising
  a roughing circuit and
  a cleaning circuit, wherein the roughing circuit comprises a sulfide separation stage arranged to receive a slurry comprising a ground ore product and sea water, the ground ore product comprising copper sulfide minerals and molybdenum sulfide minerals, wherein the cleaning circuit comprises a copper/molybdenum separation stage arranged to receive bulk sulfide concentrate mixed with desalinated water, the bulk sulfide concentrate comprising the copper sulfide minerals and the molybdenum sulfide minerals recovered in the roughing circuit.

According to an embodiment of the present invention, the sulfide separation stage is also arranged to receive engineered media, the engineered media functionalized to be hydrophobic so as to attract the copper sulfide minerals and the molybdenum sulfide minerals.

According to an embodiment of the present invention, the ground ore product also comprises unwanted materials, and wherein the roughing circuit further comprises a comminution stage arranged to receive an ore material and the sea water and to provide the ground ore product in the slurry, and the sulfide separation stage is further arranged to provide a processed slurry to the cleaning circuit and to discharge at least part of the unwanted materials.

According to an embodiment of the present invention, the cleaning circuit further comprises a regrinding stage arranged to receive the processed slurry, the processed slurry comprising the copper sulfide minerals and the molybdenum sulfide minerals recovered in the roughing circuit, the regrinding stage further arranged to provide a reground ore product to a cleaner flotation stage, the reground ore product comprising high pyrite tails and bulk mineral concentrate, the cleaner flotation stage arranged to discharge the high pyrite tails and to provide the bulk mineral concentrate to a bulk concentrate thickener, the bulk concentrate thickener arranged to provide a conditioned pulp containing the thickened bulk concentrate to the copper/molybdenum separation stage.

According to an embodiment of the present invention, the engineered media functionalized to be hydrophobic comprise hydrophobic engineered media, and wherein the conditioned pulp containing hydrophobic molybdenum minerals and hydrophilic copper minerals that is conditioned with sodium hydrosulfide, and the copper/molybdenum separation stage comprises:

a slurry/media mixture stage configured to receive the conditioned pulp together with the hydrophobic engineered media loaded with the hydrophobic molybdenum minerals, and to provide a slurry/media mixture; and a slurry/media separation stage configured to receive the slurry/media mixture, and provide a slurry product having a copper concentrate and the hydrophobic engineered media loaded with the hydrophobic molybdenum minerals that are separately directed for further processing.

According to an embodiment of the present invention, the slurry/media mixture stage comprises a molybdenite loading stage configured to contact the conditioned pulp with the engineered polymeric hydrophobic media, including in an agitated reaction chamber, and load the hydrophobic molybdenite on the hydrophobic engineered media.

According to an embodiment of the present invention, the slurry/media separation stage comprises a media recovery stage, including a vibrating screen, rotating trommel, or other separation device, configured to filter, separate and direct the slurry product having a copper concentrate to a copper concentrate filtration stage and the hydrophobic media product to a media wash stage.

According to an embodiment of the present invention, the copper/molybdenum separation stage comprises the media wash stage, including a vibrating screen or trommel equipped with wash water sprays, configured to clean the hydrophobic media product, eliminate entrainment of hydrophilic particles, and provide washed hydrophobic engineered media.

According to an embodiment of the present invention, the media wash stage is configured to advance the washed hydrophobic engineered media to a media stripping stage, and return a wash solution, containing any residual hydrophilic particles, to a Cu/Mo thickening stage that forms part of the slurry/media mixture stage.

According to an embodiment of the present invention, the copper/molybdenum separation stage comprises a media stripping stage configured to receive the washed hydrophobic engineered media, remove loaded hydrophobic minerals from the washed hydrophobic engineered media using a strip solution or surfactant, and provide washed and stripped hydrophobic engineered media.

According to an embodiment of the present invention, the copper/molybdenum separation stage comprises a media recovery stage, including of a screen or trommel, configured to receive the washed and stripped hydrophobic engineered media in the form of a slurried mixture of stripped media, recovered hydrophobic particles and residual strip solution, recycle recovered, washed and stripped hydrophobic engineered media to a molybdenite loading stage that forms part of the slurry/media mixture stage, filter and direct residual slurry having the molybdenum concentrate to a moly filtration stage; and recycle recovered stripping solution to the stripping stage.

According to an embodiment of the present invention, the copper/molybdenum separation stage comprises the moly filtration stage configured to receive the molybdenum concentrate and provide filtered molybdenum concentrate.

According to an embodiment of the present invention, the copper/molybdenum separation stage comprises the copper concentrate filtration stage configured to receive the slurry product and provide a filtered slurry product having a filtered copper concentrate.

According to an embodiment of the present invention, the conditioned pulp is formed in part from a pulp that is thickened by a copper/molybdenite concentrate thickening stage configured upstream copper/molybdenum separation processor.

According to an embodiment of the present invention, the hydrophobic engineered media comprises polymeric engineered beads/bubbles made of a synthetic material having a plurality of molecules with a siloxane functional group configured to attract the mineral particles of interest, including molybdenum concentrate.

According to an embodiment of the present invention, the synthetic material has a coating with the plurality of molecules with the siloxane functional group configured to attract the mineral particles of interest, including molybdenum concentrate.

According to an embodiment of the present invention, the coating comprises a silicone gel that includes, or takes the form of, molecules having the siloxane functional group, including a siloxane that is, or takes the form of, a functional group in organosilicon chemistry with the Si—O—Si linkage.

According to an embodiment of the present invention, parent siloxanes include, or take the form of, oligomeric and polymeric hydrides with the formulae $H(OSiH_2)_nOH$ and $(OSiH_2)_n$.

According to an embodiment of the present invention, the siloxane includes branched compounds, where the defining feature includes each pair of silicon centers being separated by one oxygen atom.

According to an embodiment of the present invention, the silicone gel takes the form of a product sold in a combination that includes 3-4222 Dielectric Firm Gel Part A and 3-4222 Dielectric Firm Gel Part B.

According to an embodiment of the present invention, the silicone gel comes with two parts, including:

Part A that includes dimethyl siloxane, dimethylvinyl-terminated—68083-19-2; polydimethylsiloxane—63148-62-9; reaction of ethylene glycol and silica—170424-65-4; hydrotreated light naphthenic petroleum distillate—64742-53-6; and Part B that includes dimethyl siloxane, dimethylvinyl-terminated—68083-19-2; polydimethylsiloxane—63148-62-9; dimethyl siloxane, hydrogen-terminated—none; trimethylated silica—68909-20-6; dimethyl, methylhydrogen siloxane—68037-59-2.

According to an embodiment of the present invention, the hydrophobic engineered media comprises polymeric engineered beads/bubbles having surfaces made of a polymer and coated with a silicone gel to provide the siloxane functional group.

According to an embodiment of the present invention, the surfaces are rendered hydrophobic by having chemicals with a siloxane functional group.

The present invention will become apparent upon reading the description in conjunction with FIGS. 3 to 11d.

BRIEF DESCRIPTION OF THE DRAWINGS

FIG. 7 illustrates an interaction chamber, according to a different embodiment of the present invention.

DETAILED DESCRIPTION OF THE INVENTION

According to some embodiments, the present invention may take the form of a system having a roughing circuit and a cleaning circuit. In the roughing circuit, sea water is used to mix with the ground ore in the comminution stage to form a slurry. Xanthate collectors are added to the slurry to render the sulfide minerals hydrophobic. The slurry containing sulfide minerals is processed through flotation with engineered collection media or processed through non-flotation based apparatus with collection surfaces having a hydrophobic coating to attract the sulfide minerals. In the cleaning stage, desalinated water is at least used at the moly plant.

Figure 1:
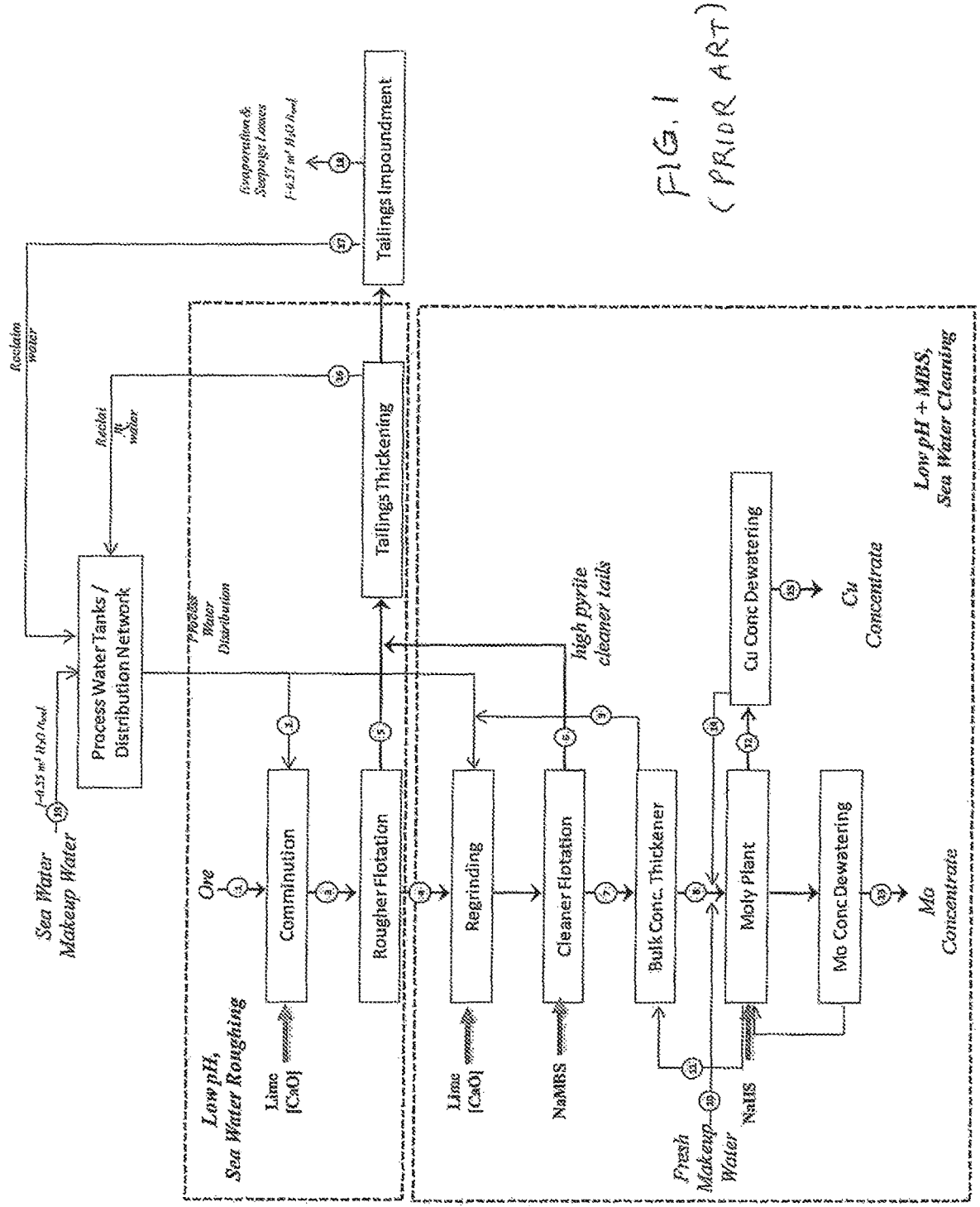
FIG. 1 illustrates a prior art sea water flotation system.
Figure 2:
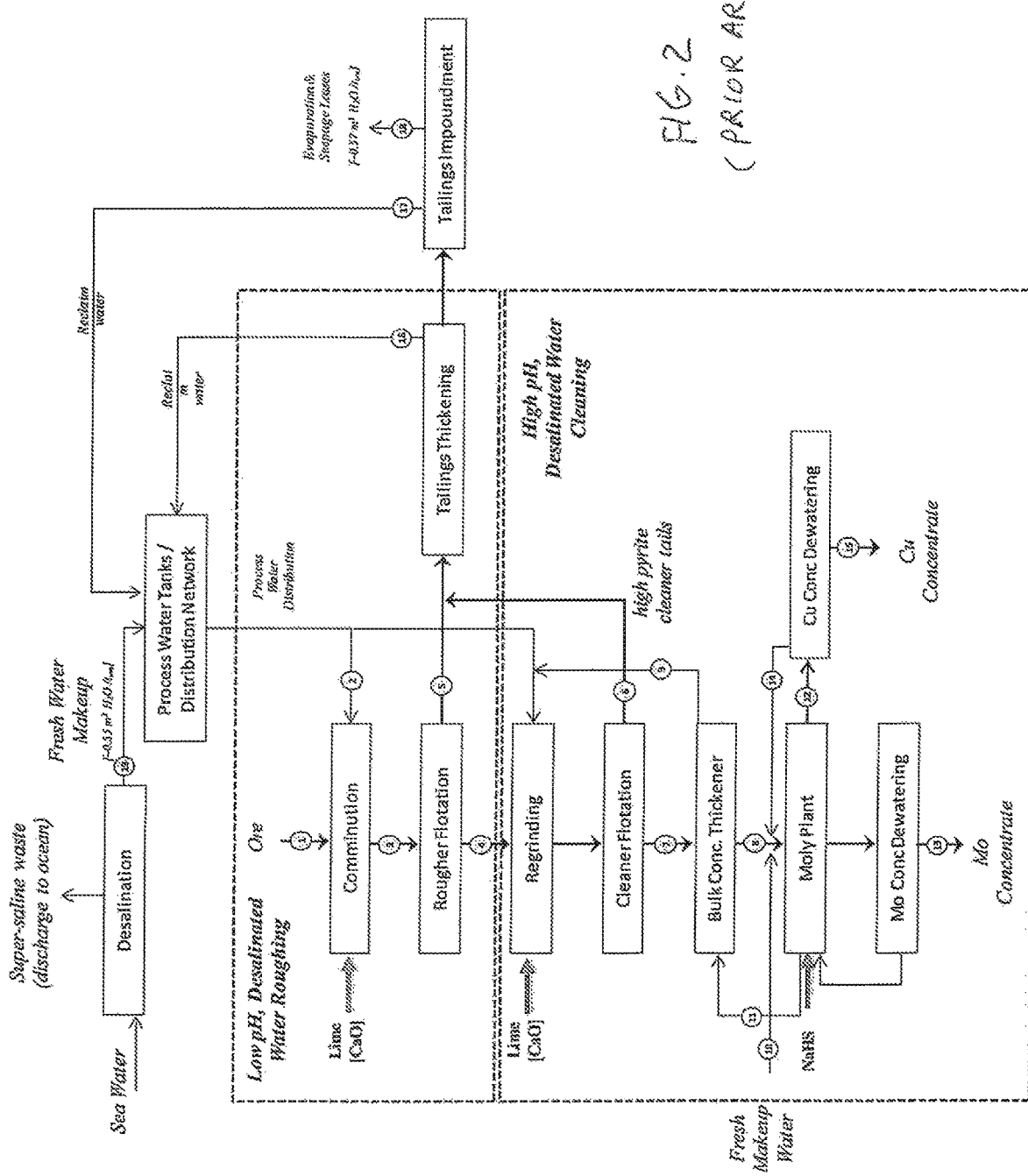
FIG. 2 illustrates a prior art desalinated-water flotation system.
Figure 3:
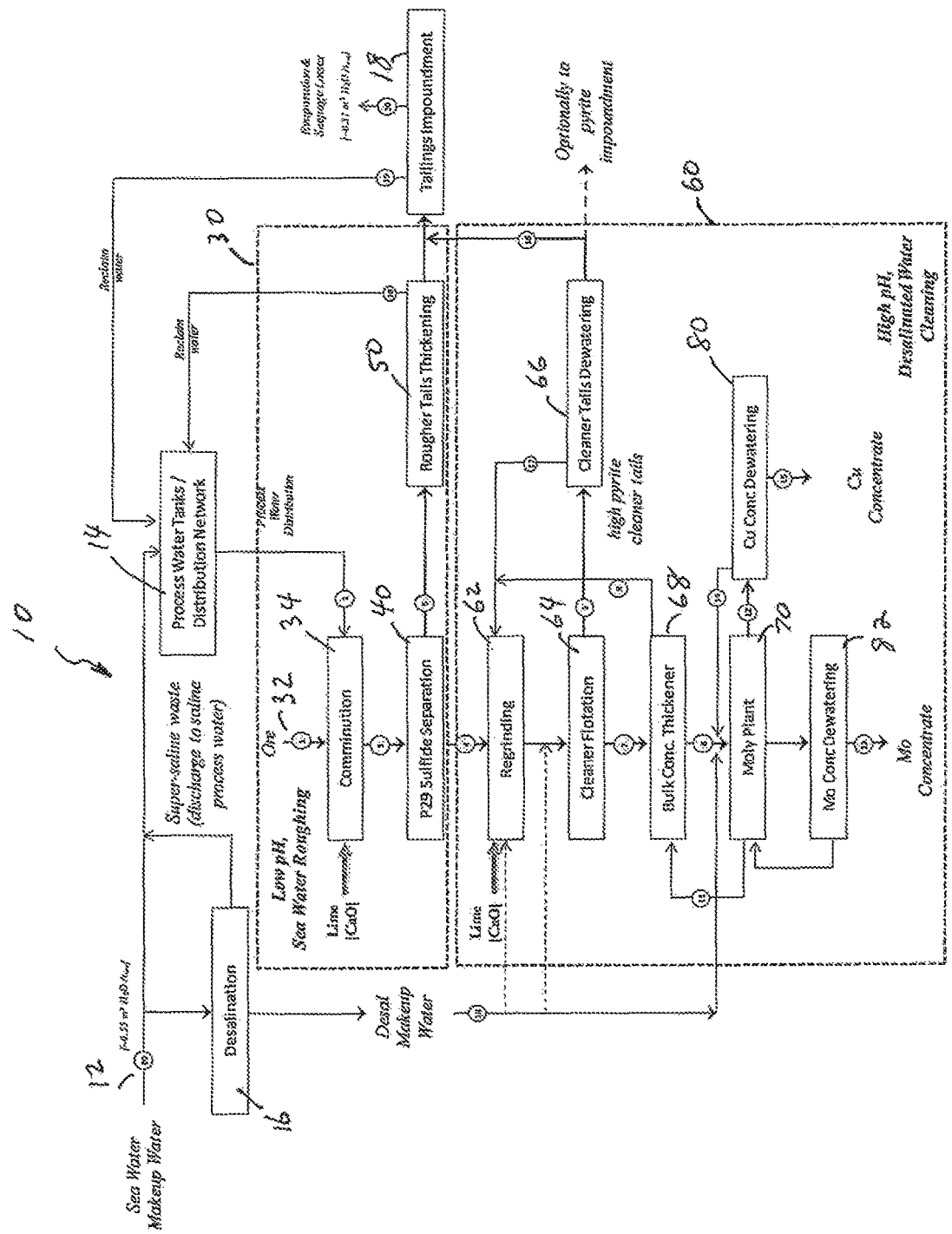
FIG. 3 illustrates a copper/molybdenum processing system, according to an embodiment of the present invention.
Figure 4:
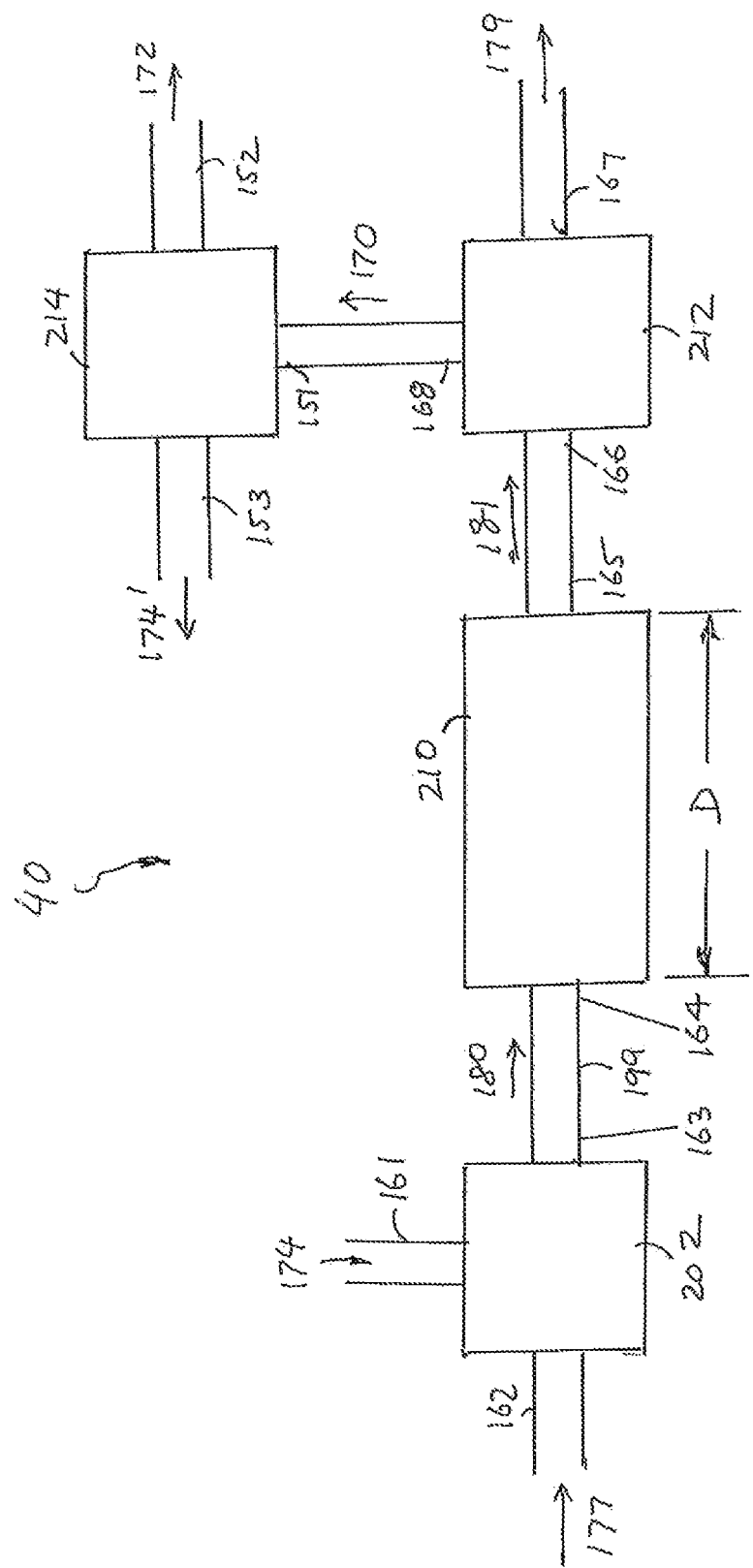
FIG. 4 illustrates a media-sulfide separation stage, according to an embodiment of the present invention.
Figure 5:
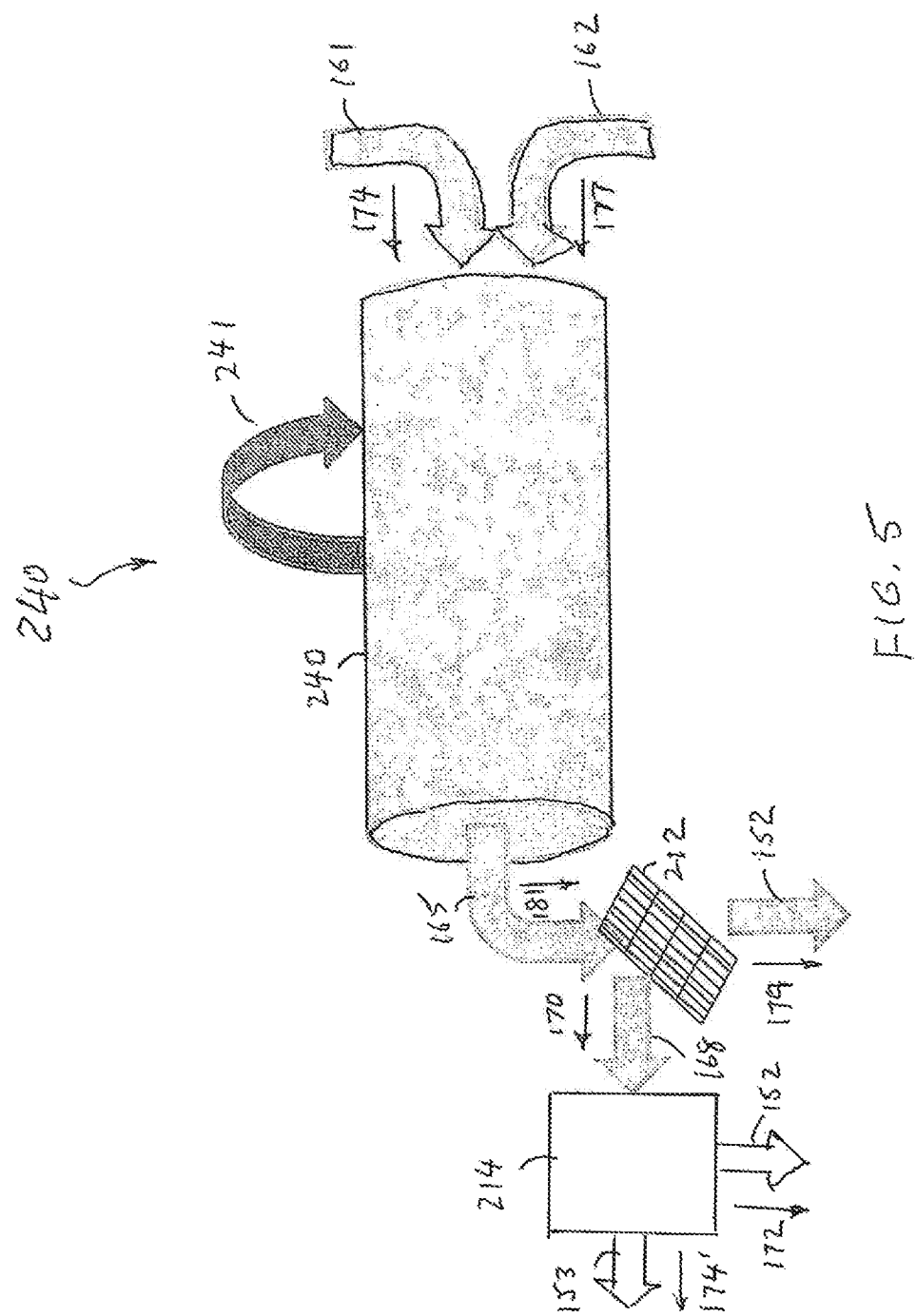
FIG. 5 illustrates an interaction chamber, according to an embodiment of the present invention.

As shown in FIG. 3, the copper/molybdenum processing system 10 comprises a roughing circuit 30 and a cleaning circuit 60. In the roughing circuit 30, ground ore is mixed with sea water to form a slurry. In the cleaning circuit 60, desalinated water is used at least at a moly plant 70, which is also referred to as a copper/molybdenum separation stage. To fulfill the need of water usage, the system circuit 10 has an input 12 to receive sea water. The received sea water is directed to a process water tanks/distribution network 14 where sea water is provided to a comminution stage 34. The received sea water is also directed to a desalination facility 16 for providing desalinated makeup water to the cleaning circuit 60. The roughing circuit 30 has an input 32 arranged to receive a mineral bearing ore. The received ore is directed to the comminution stage 34 where the ore is crushed or ground. The ore includes desirable minerals and unwanted materials known as gangue. The crushed or ground ore is mixed with sea water to form a slurry. The desirable minerals include chalcopyrite, bornite and molybdenite. The unwanted materials include undesirable sulfide minerals such as pyrite. In order to render the sulfide minerals hydrophobic, xanthate collectors or other surfactants are used. Lime (CaO) is also used to increase the pH of sea water to 9 to 10.5 so as to recover all of the sulfides in a floating process or non-flotation recovery process. As shown in FIG. 3, the floating process or other sulfide recovery techniques are used to remove the rougher tails from the concentrated sulfides in a "P20 Sulfide Separation" stage 40, which is also referred to as a sulfide separation stage. Exemplary sulfide separation apparatus are shown in FIGS. 4-7. As shown in FIGS. 4 and 5, the sulfide separation stage 40 is arranged to provide a processed slurry to the cleaning circuit 60. The processed slurry contains recovered copper sulfide minerals and molybdenum sulfide minerals.

According to an embodiment of the present invention, engineered collection media (also referred to as engineered bubbles or beads, barren media that are functionalized to be hydrophobic) are used to attract minerals in the slurry in a flotation tank or in a non-flotation mineral recovery apparatus. In the flotation tank, according to an embodiment of the present invention, lightweight hydrophobic engineered bubbles or beads are used to float the mineral particles of interest. In a non-flotation mineral recovery apparatus, hydrophobic engineered beads are mixed with the slurry and the apparatus are arranged to provide an environment in which the mineral interest are allowed to have an improved probability of contact with the hydrophobic engineered beads. Examples of non-flotation mineral recovery apparatus are shown in FIGS. 4-7. Alternatively, a hydrophobic coating provided on a conveyor belt, filter, panel or other collection surfaces is used to attract mineral particles. The engineered bubbles or beads are shown in FIGS. 9A to 11e.

The recovered sulfides from the separation stage 40 are directed to the cleaning circuit 60, whereas the tailings containing gangue are directed to a rougher tails thickening stage 50. Reclaimed sea water from the rougher tails thickening stage 50 can be recycled back to the process water tank/Distribution network 14. The thickened rougher tails is directed to a pond 18 or the like for impoundment.

In the cleaning circuit 60, the remaining ore containing the recovered sulfides is reground at a regrinding stage 62 and lime is again added to the processed slurry. Because untreated sea water contains salts, particularly those of magnesium and calcium, when combined with the pH buffering effect of sea water at pH above approximately 9.5, the use of lime is constrained in depressing pyrite. Desalinated makeup water is used in the regrinding stage 62. As such, metabisulfide (MBS) such as sodium metabisulfide (NaMBS) or potassium metabisulfide (KMBS) is not needed for depressing pyrite at the cleaner flotation stage 64. At the cleaner flotation stage 64, the high pyrite cleaner tails are directed to a cleaner tails dewatering stage 66. The copper/molybdenum concentrate from the cleaner flotation stage 64 is directed to a bulk concentration thickener stage 68. The high pyrite tails from the cleaner flotation stage 64, after dewatered at the dewatering stage 66, may be directed to the tails impoundment stage 18. Desalinated water reclaimed from the cleaner tails dewatering stage 66 and from the bulk concentrate thickener stage 68 can be directed back to the regrinding stage 62. Underflow from the bulk concentrate thickener stage 68 may be mixed and conditioned with sodium hydrosulfide (NaHS) in order to render the copper and iron sulfide minerals hydrophilic so as to form a conditioned pulp. Thus the conditioned pulp hydrophobic molybdenum minerals and hydrophilic copper minerals that is conditioned with sodium hydrosulfide.

Figure 8A:
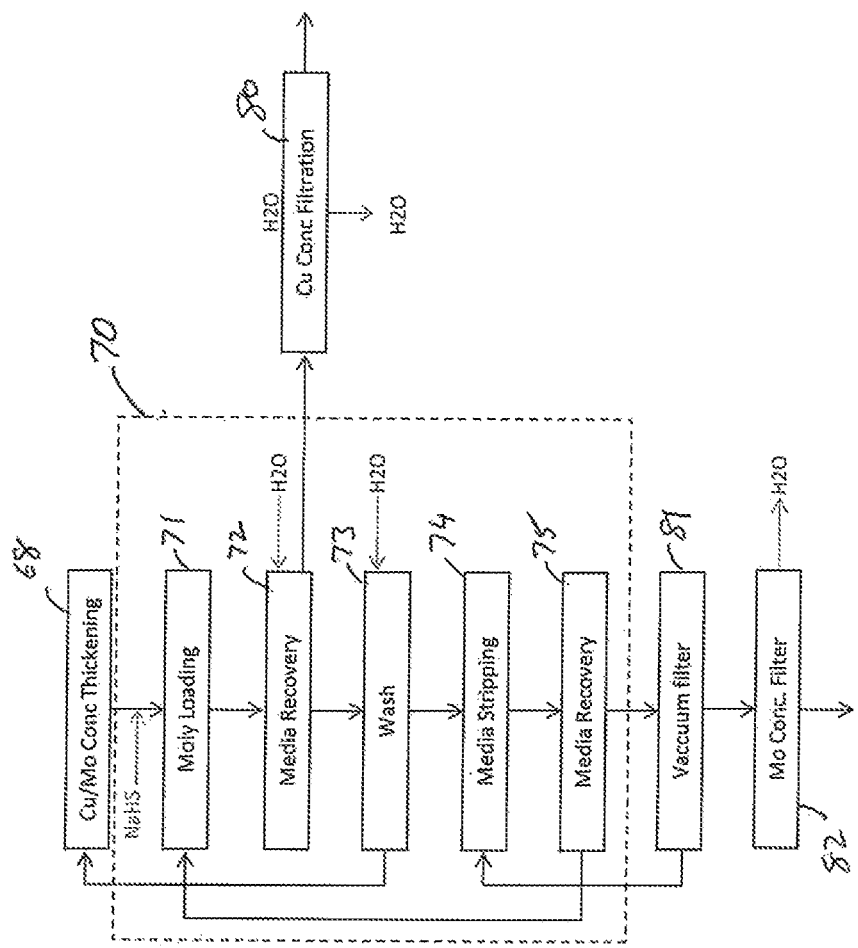
FIG. 8A illustrates a moly plant, according to an embodiment of the present invention.
Figure 8B:
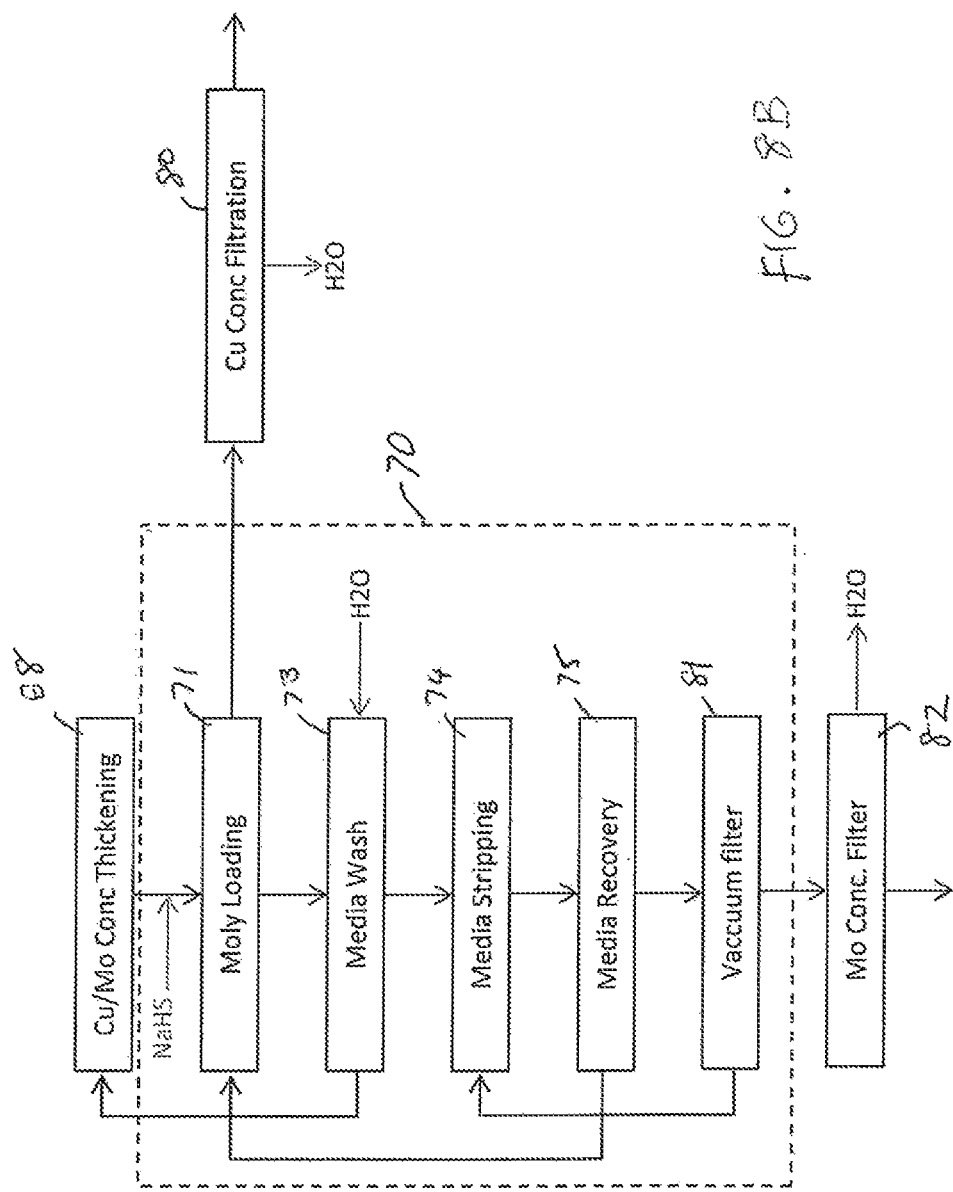
FIG. 8B illustrates a moly plant, according to another embodiment of the present invention.

In a Moly Plant 70, with desalinated water, the conditioned pulp is processed to separate the copper concentrate from the molybdenum concentrate. The Moly Plant 70, according to embodiments of the present invention, is shown in FIGS. 8A and 8B. The copper concentrate is dewatered at stage 80. The molybdenum concentrate is dewatered at stage 82.

FIGS. 4-7 illustrate various embodiments for recovering the sulfides from the slurry after the comminution stage 34.

As shown in FIG. 4, the sulfide separation stage 40 comprises a media mixer 202 and interaction chamber 210. The media mixer 202 has a first input 161 arranged to receive engineered collection media 174; a second input 162 arranged to receive the slurry 177 from the comminution stage 34; and an output 163 arranged to provide a mixture 180 containing slurry 177 and engineered collection media 174. In the mixture 180, there may already be enriched engineered collection media 170 having mineral particles 172 attached thereon. Here mineral particles 172 are sulfide minerals in the slurry 177. The interaction chamber 210 has an input 164 arranged to receive the mixture 180 and an output 165 to discharge a mixture 181. The interaction chamber 210, as can be seen in FIG. 4, allows the mineral particles 172 to attach to the engineered collection media 174. Thus, when the mixture 181 is discharged from the interaction chamber 210, the mixture 181 is rich in enriched engineered collection media 170. In this sulfide mineral processing system, the enriched engineered collection media 170 are also referred to as sulfide laden media. The mixture 181 also contains undesirable ore material, or rougher tails 179. The mixture 181 discharged from the interaction chamber 210 is received via an input 166 into a media separator 212, wherein the mixture 181 is separated into enriched engineered collection media 170 and rougher tails 179. The rougher tails 179 are discharged from an output 167 to the rougher tails thickening stage 50 (see FIG. 3). The enriched engineered collection media 170 are discharged from an output 168 to a media cleaning unit 214 wherein the sulfide mineral particles 172 are stripped off the enriched engineered collection media 170. After stripping, the engineered collection media, barren media or recovered media 174' may be recycled through output 153 back to the media mixer 202. The mineral particles 172 are collected through the output 152. In FIG. 4, D indicates the footprint of the interaction chamber 210 as compared to the footprint of the interaction chambers as shown in FIGS. 6 and 7.

The interaction chamber 210 can take the form of a tumbler 240 as shown in FIG. 5. As shown in FIG. 5, the tumbler 240 is arranged to receive slurry 177 via input 162 and engineered collection media 174 via input 162. The tumbler 240 is arranged to turn about the rotation direction 241 so as to mix the slurry 177 and the engineered collection media 174 and to allow the sulfide minerals in the slurry 177 to attach to the engineered collection media 174 to become sulfide laden media 170. The sulfide laden media are mixed with the rougher tails 179 in a mixture 181. In this embodiment, the media separator 212 is depicted as a screen which allows the rougher tails 179 to pass through while the sulfide laden media 170 are directed to a media cleaning unit 214 in order to recover sulfide minerals 172 and the barren media 174'.

Figure 6:
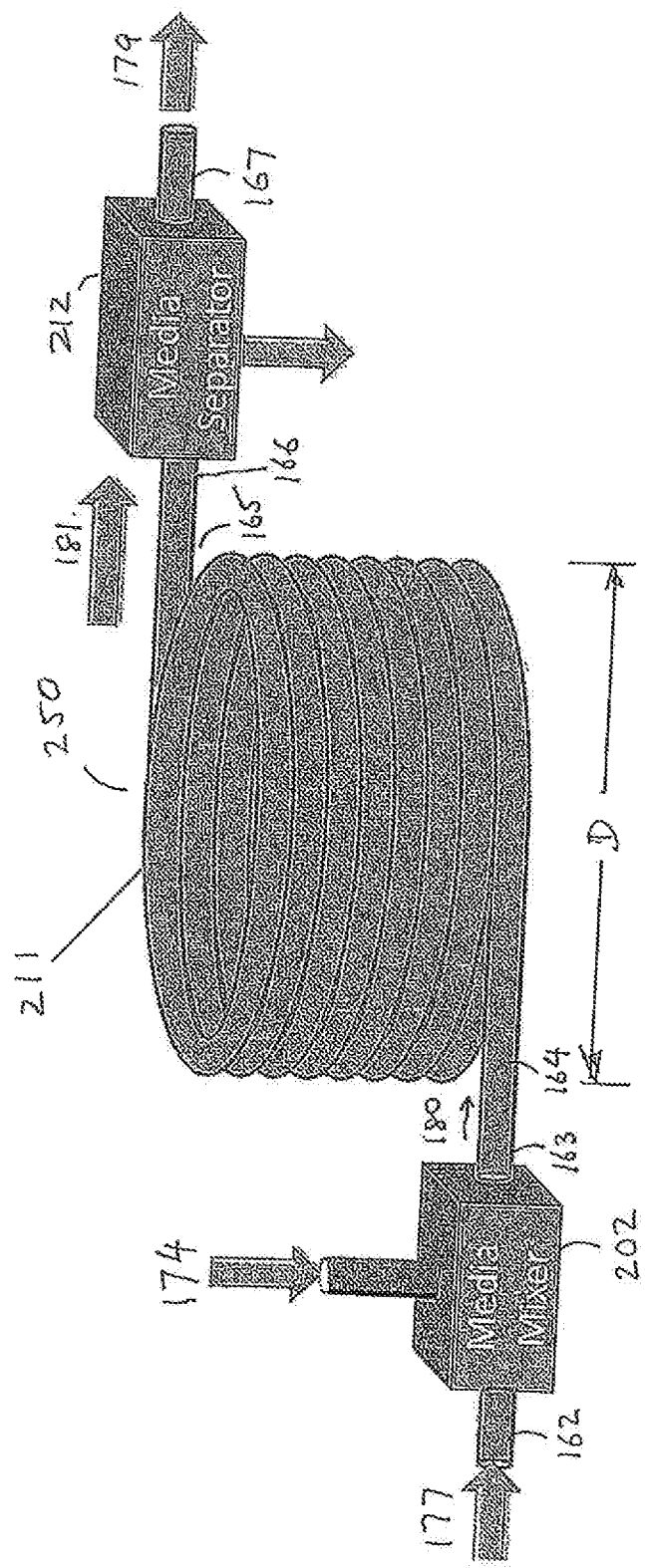
FIG. 6 illustrates an interaction chamber, according to another embodiment of the present invention.

In the embodiment as shown in FIG. 6, the interaction chamber 210 takes the form of a multi-loop interaction vessel 250. The interaction vessel 210 has a continuous fluid conduit, or pipeline, which is coiled into a compact structure to increase the residence time of the mixture 180 within the interaction vessel. The interaction vessel 210 can be made from a part of a fluid conduit or pipeline and coiled into loops 211. As can be seen in FIG. 6, the diameter of the loops is D and the flow path in the loop 211 is about 3×D. If there are 8 loops, then the flow part in the entire vessel is about 24×D. Thus, the residence time of the mixture 180 within the vessel 250 is increased by 24 folds as compared to the residence time in a straight pipe of length D.

In the embodiment as shown in FIG. 7, the interaction chamber 210 takes the form of a manifold interaction vessel 260. As illustrated in FIG. 7, the interaction vessel 260, the fluid conduit is folded into a manifold having a number of conduit segments 213 of length D. If the interaction vessel 260 is formed from a matrix of 10×10 conduit segments 213, then the entire flow path in the manifold is 100×D. Thus, the residence time of the mixture 180 within the vessel 260 is increased by 100 folds as compared to the residence time in a straight segment of length D.

FIG. 8A illustrates a moly plant according to an embodiment of the present invention, By way of example, the process of the moly plant 70, starting with the bulk sulfide concentrate, is or operates as follows.

1. Underflow from a bulk sulfide thickener ("Cu/Mo Conc Thickener") in step/stage 68 may be mixed and conditioned with sodium hydrosulfide (NaHS) in order to render the copper and iron sulfide minerals hydrophilic, so as to form a conditioned pulp.

2. In a molybdenum loading step/stage 71, the conditioned pulp may be contacted with the engineered polymeric hydrophobic media, e.g. in an agitated reaction chamber, and hydrophobic molybdenite is loaded on the engineered polymeric hydrophobic media, so as to form a slurry/media mixture. By way of example, the agitated reaction chamber may include, or take the form of, a tumbler-style reaction chamber, as well as a mechanical, rotating/tumbling, gravity flow, chemical, pneumatic, centrifugal reaction chamber. The engineered polymeric hydrophobic media may take the form of engineered polymeric bubble/beads, e.g., consistent with that set forth herein. The engineered polymeric hydrophobic media may also take the form of other engineered polymeric hydrophobic media disclosed herein.

3. The slurry/media mixture may be fed to a media recovery step/stage 72, e.g. consisting of a vibrating screen, rotating trommel or equivalent size- or other separation device, so as to recover a slurry product and a polymerized hydrophobic media product. As shown in FIG. *A, water ($H^2O$) may be added to the recovery media stage 72. In the media recovery step/stage 72, the slurry product may be directed to a copper concentrate filtration step/stage 608 and the engineered polymeric hydrophobic media product may be directed to a wash step/stage 73. The copper concentrate filtration step/stage 80 filters and provides a copper concentrate.

4. By way of example, the media wash step/stage 73 may consist of a vibrating screen, trommel or equivalent equipped with wash water sprays to clean the loaded engineered polymeric hydrophobic media and eliminate the entrainment of hydrophilic particles. As shown in FIG. 8A, water ($H^2O$) may be added to the wash step/stage 73. In the media wash step/stage 73, the media may be advanced to a stripping stage 74 and the wash solution, e.g., containing any residual hydrophilic particles, is returned to the Cu/Mo thickening step/stage 68.

5. The cleaned media reports or may be provided to the media stripping step/stage 74 to remove the loaded hydrophobic minerals from the engineered polymeric hydrophobic media using a strip solution, surfactant, or equivalent.

6. The media stripping step/stage 74 may be configured to direct the slurried mixture of stripped media, recover hydrophobic particles and residual strip solution to a second media recovery step/stage 75, e.g., consisting of a screen, trommel, or equivalent device. The second media recovery step/stage 74 may be configured to recycle/return recovered media to the moly loading step/stage 71, and provide the remaining slurried mixture to a vacuum filter step/stage 81.

7. The vacuum filter step/stage 81 may be configured to recycle recovered strip solution to the media stripping step/stage 74, and filter and direct residual slurry, e.g., having recovered hydrophobic particles, to a moly concentration filter or filtration step/stage 82 that filters and provides molybdenum concentrate.

Embodiments are also envisioned, and the scope of the invention is intended to include, e.g., implementing the aforementioned Cu/Mo separation media technology consistent with that set forth above, followed by a subsequent regrind step to improve liberation and the resulting grade.

Embodiments are also envisioned, and the scope of the invention is intended to include, e.g., implementing the aforementioned Cu/Mo separation media technology consistent with that set forth above, using multiple loading/stripping cycles also to improve liberation and the resulting grade.

Advantages

The process according to the present invention, when taken in the context of the current state of the art set forth above, confers the following advantages:

1. It significantly reduces the consumption of expensive sodium hydrosulfide, because the primary cause of NaHS oxidation (air) is no longer necessary to achieve a molybdenum separation.

2. The elimination of entrainment greatly increases the selectivity of the process, and obviates the need for a complex sequence of cleaning flotation steps.

3. The removal of the froth zone greatly simplifies the materials handling operations of the process.

4. The ability to perform the separation at a high percent solids eliminates the need for the redundant copper concentrate thickener.

5. The improved grade will allow byproduct producers to sell byproduct molybdenite into the chemicals market.

FIG. 8B

By way of further example, see and compare the Cu/Mo separation media technology shown in FIG. 8B to that shown in FIG. 8A.

By way of example, the process of the moly plant 70, starting with the bulk sulfide concentrate, is or operates as follows.

1. Underflow from a bulk sulfide thickener ("Cu/Mo Conc Thickener") in step/stage 68 may be mixed and conditioned with sodium hydrosulfide (NaHS) in order to render the copper and iron sulfide minerals hydrophilic, so as to form a conditioned pulp.

2. In a moly loading step/stage 71, the conditioned pulp may be contacted with an engineered polymeric hydrophobic media, e.g. in an agitated reaction chamber, and hydrophobic molybdenite is loaded on the engineered polymeric hydrophobic media, so as to form a slurry/media mixture. The molybdenum loading step/stage 71 may be configured to direct a slurry product to a copper concentrate filtration step/stage 80 and direct remaining media in the slurry/media mixture to a media wash step/stage 73. The copper concentrate filtration step/stage 80 may be configured to filter and provide a copper concentrate.

3. By way of example, the media wash step/stage 73 may consist of a vibrating screen, trommel or equivalent equipped with wash water sprays to clean the loaded media and eliminate the entrainment of hydrophilic particles. As shown in FIG. 8B, water ($H^2O$) may be added to the wash step/stage 73. In the media wash step/stage 708, the media may be advanced to a media stripping stage 74 and the wash solution, e.g., containing any residual hydrophilic particles, is returned to the Cu/Mo thickening step/stage 68.

4. The cleaned media reports or is provided to the media stripping step/stage 74 to remove the loaded hydrophobic minerals from the media using a strip solution, surfactant, or equivalent.

5. The media stripping step/stage 74 may be configured to direct the slurried mixture of stripped media, recovered hydrophobic particles and residual strip solution to a media recovery step/stage 75, e.g., consisting of a screen, trommel, or equivalent device. The media recovery step/stage 75 may be configured to recycle/return recovered media to the molybdenum loading step/stage 71, and provide the remaining slurried mixture to a vacuum filter step/stage 81.

6. The vacuum filter step/stage 81 may be configured to recycle recovered strip solution to the media stripping step/stage 74, and filter and direct residual slurry, e.g., having recovered hydrophobic particles, to a moly concentration filter or filtration step/stage 82 that filters and provides a molybdenum concentrate.

FIGS. 9a, 9b, 10a-10e and 11a-11d

Figure 9B:
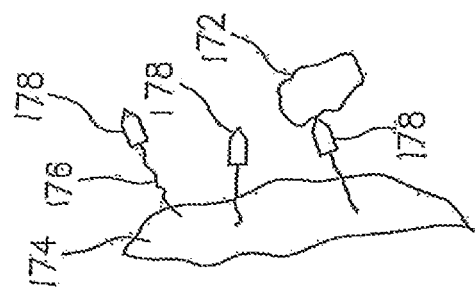
FIG. 9b illustrates part of a loaded bead having molecules to attract mineral particles.
Figure 9A:
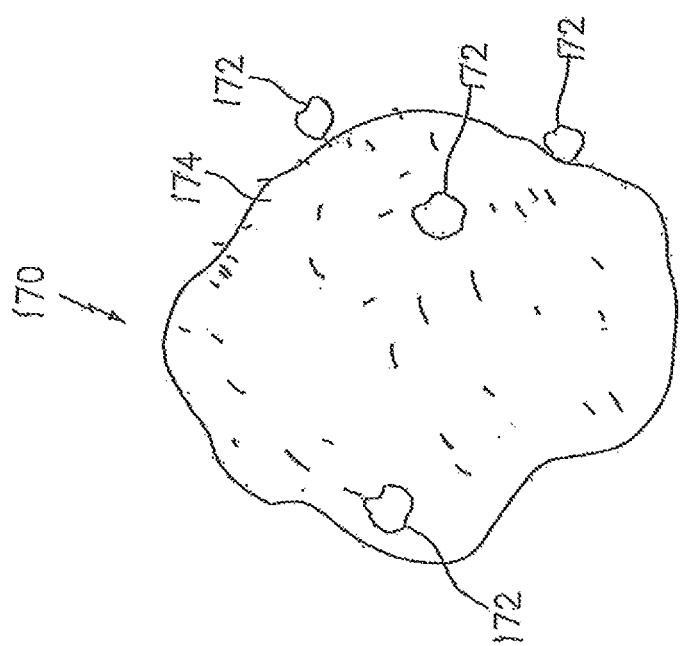
FIG. 9a illustrates a mineral laden synthetic bead, or loaded bead.

FIG. 9a illustrates a mineral laden synthetic bead, or loaded bead 170. As illustrated, a synthetic bead 174 can attract many mineral particles 172. FIG. 5b illustrates part of a loaded bead having molecules (176, 178) to attract mineral particles.

As shown in FIGS. 9a and 9b, the synthetic bead 174 has a bead body to provide a bead surface. At least the outside part of the bead body is made of a synthetic material, such as polymer, so as to provide a plurality of molecules or molecular segments 176 on the surface of the bead 174. The molecule 176 is used to attach a chemical functional group 178 to the surface of bead 174. In general, the molecule 176 can be a hydrocarbon chain, for example, and the functional group 178 can have an anionic bond for attracting or attaching a mineral, such as copper to the surface. A xanthate, for example, has both the functional group 178 and the molecular segment 176 to be incorporated into the polymer that is used to make the synthetic bead 174. A functional group 178 is also known as a collector that is either ionic or non-ionic. The ion can be anionic or cationic. An anion includes oxyhydryl, such as carboxylic, sulfates and sulfonates, and sulfhydral, such as xanthates and dithiophosphates. Other molecules or compounds that can be used to provide the function group 178 include, but are not limited to, thionocarboamates, thioureas, xanthogens, monothiophosphates, hydroquinones and polyamines. Similarly, a chelating agent can be incorporated into or onto the polymer as a collector site for attracting a mineral particle. As shown in FIG. 9b, a mineral particle 172 is attached to the functional group 178 on a molecule 176. In general, the mineral particle 172 is much smaller than the synthetic bead 174. Many mineral particles 172 can be attracted to or attached to the surface of a synthetic bead 174.

Figures 10A, 10B, 10C, 10D, 10E:
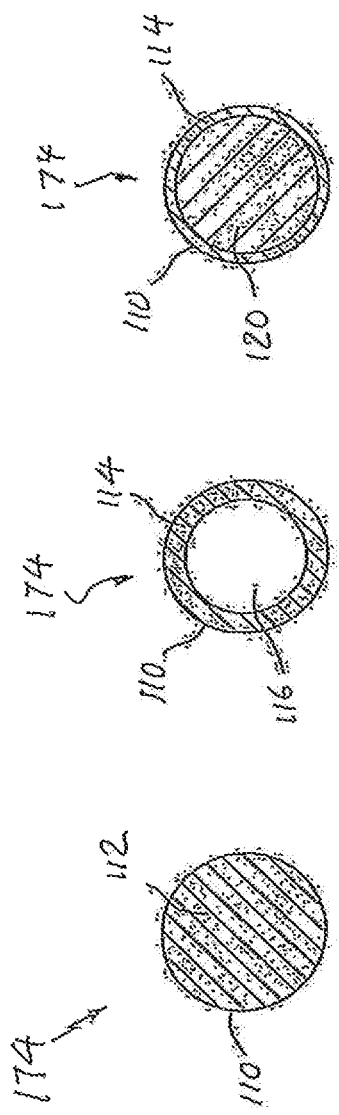
FIG. 10a-10e illustrate synthetic bead with different shapes and structures.

In some embodiments of the present invention, a synthetic bead has a solid-phase body made of a synthetic material, such as polymer. The polymer can be rigid or elastomeric. An elastomeric polymer can be polyisoprene or polybutadiene, for example. The synthetic bead 174 has a bead body 110 having a surface comprising a plurality of molecules with one or more functional groups for attracting mineral particles to the surface. A polymer having a functional group to collect mineral particles is referred to as a functionalized polymer. In one embodiment, the entire interior part 112 of the body 110 of the synthetic bead 174 is made of the same functionalized material, as shown in FIG. 10a. In another embodiment, the bead body 110 comprises a shell 114. The shell 114 can be formed by way of expansion, such as thermal expansion or pressure reduction. The shell 114 can be a micro-bubble or a balloon. In FIG. 10b, the shell 114, which is made of functionalized material, has an interior part 116. The interior part 116 can be filled with air or gas to aid buoyancy, for example. The interior part 116 can be used to contain a liquid to be released during the mineral separation process. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell 114 can be used to encapsulate a powder which can have a magnetic property so as to cause the synthetic bead to be magnetic, for example. The encapsulated liquid or powder may contain monomers, oligomers or short polymer segments for wetting the surface of mineral particles when released from the beads. For example, each of the monomers or oligomers may contain one functional group for attaching to a mineral particle and an ion for attaching the wetted mineral particle to the synthetic bead. The shell 84 can be used to encapsulate a solid core, such as Styrofoam to aid buoyancy, for example. In yet another embodiment, only the coating of the bead body is made of functionalized polymer. As shown in FIG. 10c, the synthetic bead has a core 120 made of ceramic, glass or metal and only the surface of core 120 has a coating or shell 114 made of functionalized polymer. The core 120 can be a hollow core or a filled core depending on the application. The core 120 can be a micro-bubble, a sphere or balloon. For example, a filled core made of metal makes the density of the synthetic bead to be higher than the density of the pulp slurry, for example. The core 120 can be made of a magnetic material so that the para-, ferri-, ferro-magnetism of the synthetic bead is greater than the para-, ferri-, ferro-magnetism of the unwanted ground ore particle in the mixture. In a different embodiment, the synthetic bead can be configured with a ferro-magnetic or ferri-magnetic core that attract to paramagnetic surfaces. A core 120 made of glass or ceramic can be used to make the density of the synthetic bead substantially equal to the density of the pulp slurry so that when the synthetic beads are mixed into the pulp slurry for mineral collection, the beads can be in a suspension state.

According to a different embodiment of the present invention, the synthetic bead 174 can be a porous block 117 or take the form of a sponge or foam with multiple segregated gas filled chambers as shown in FIGS. 10d and 10e. FIG. 10e illustrates a synthetic bead 174 made from a foam block 118. The foam block 118 can be made of an open-cell foam.

It should be understood that the term "bead" does not limit the shape of the synthetic bead of the present invention to be spherical, as shown in FIGS. 10a-10d. In some embodiments of the present invention, the synthetic bead 174 can have an elliptical shape, a cylindrical shape, a shape of a block. Furthermore, the synthetic bead can have an irregular shape.

Figure 11C:
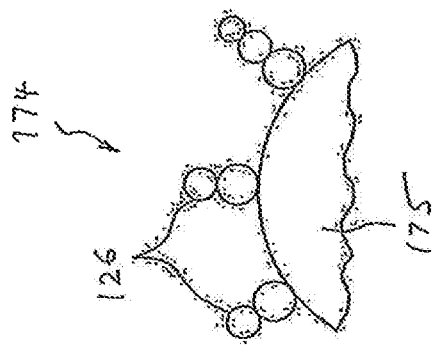
FIGS. 11a-11d illustrate various surface structure on a synthetic bead to increase the collection surface.
Figure 11D:
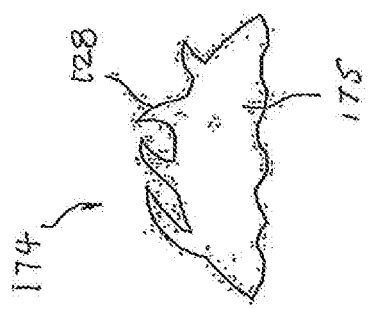
Figure 11B:
Figure 11A:
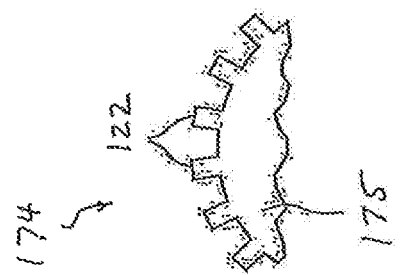

It should also be understood that the surface of a synthetic bead, according to the present invention, is not limited to an overall smooth surface as shown in FIGS. 10a-10e. In some embodiments of the present invention, the surface can be irregular and rough. For example, the surface 175 of the bead 174 can have some physical structures 122 like grooves or rods as shown in FIG. 11a. The surface 175 of bead 174 can have some physical structures 124 like holes or dents as shown in FIG. 11b. The surface 175 of bead 174 can have some physical structures 126 formed from stacked beads as shown in FIG. 11c. The surface 174 can have some hair-like physical structures 128 as shown in FIG. 11d. In addition to the functional groups on the synthetic beads that attract mineral particles to the bead surface, the physical structures can help trapping the mineral particles on the bead surface. The surface of bead 174 can be configured to be a honeycomb surface or sponge-like surface for trapping the mineral particles and/or increasing the contacting surface.

It should also be noted that the synthetic beads of the present invention can be realized by a different way to achieve the same goal. Namely, it is possible to use a different means to attract the mineral particles to the surface of the synthetic beads. For example, the surface of the polymer beads, shells can be functionalized with a hydrophobic chemical molecule or compound. The synthetic beads and/or engineered collection media can be made of a polymer. The term "polymer" in this specification means a large molecule made of many units of the same or similar structure linked together. Furthermore, the polymer can be naturally hydrophobic or functionalized to be hydrophobic. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The bubbles or beads, such as synthetic bead 174 can be made of glass to be coated with hydrophobic silicone polymer including polysiloxanates so that the bubbles or beads become hydrophobic. The bubbles or beads can be made of metal to be coated with silicone alkyd copolymer, for example, so as to render the bubbles or beads hydrophobic. The bubbles or beads can be made of ceramic to be coated with fluoroalkylsilane, for example, so as to render the bubbles and beads hydrophobic. The bubbles or beads can be made of hydrophobic polymers, such as polystyrene and polypropylene to provide a hydrophobic surface. The wetted mineral particles attached to the hydrophobic synthetic bubble or beads can be released thermally, ultrasonically, electromagnetically, mechanically or in a low pH environment.

The multiplicity of hollow objects, bodies, elements or structures may include hollow cylinders or spheres, as well as capillary tubes, or some combination thereof. The scope of the invention is not intended to be limited to the type, kind or geometric shape of the hollow object, body, element or structure or the uniformity of the mixture of the same.

In general, the mineral processing industry has used flotation as a means of recovering valuable minerals. This process uses small air bubbles injected into a cell containing the mineral and slurry whereby the mineral attaches to the bubble and is floated to the surface. This process leads to separating the desired mineral from the gangue material. Alternatives to air bubbles have been proposed where small spheres with proprietary polymer coatings are instead used. This disclosure proposes a new and novel media type with a number of advantages.

One disadvantage of spherical shaped recovery media such as a bubble, is that it possesses a poor surface area to volume ratio. Surface area is an important property in the mineral recovery process because it defines the amount of mass that can be captured and recovered. High surface area to volume ratios allows higher recovery per unit volume of media added to a cell. As illustrated in FIG. 8e, open-cell foam and sponge-like material can be engineered collection media. Open cell or reticulated foam offers an advantage over other media shapes such as the sphere by having higher surface area to volume ratio. Applying a functionalized polymer coating that promotes attachment of minerals to the foam "network" enables higher recovery rates and improved recovery of less liberated minerals when compared to the conventional process. For example, open cells allow passage of fluid and particles smaller than the cell size but capture mineral bearing particles that come in contact with the functionalized polymer coating. Selection of cell size is dependent upon slurry properties and application.

The coated foam may be cut in a variety of shapes and forms. For example, a polymer coated foam belt can be moved through the slurry to collect the desired minerals and then cleaned to remove the collected desired minerals. The cleaned foam belt can be reintroduced into the slurry. Strips, blocks, and/or sheets of coated foam of varying size can also be used where they are randomly mixed along with the slurry in a mixing cell. The thickness and cell size of a foam can be dimensioned to be used as a cartridge-like filter which can be removed, cleaned of recovered minerals, and reused.

As mentioned earlier, the open cell or reticulated foam, when coated or soaked with hydrophobic chemical, offers an advantage over other media shapes such as sphere by having higher surface area to volume ratio. Surface area is an important property in the mineral recovery process because it defines the amount of mass that can be captured and recovered. High surface area to volume ratios allows higher recovery per unit volume of media added to a cell.

The open cell or reticulated foam provides functionalized three dimensional open network structures having high surface area with extensive interior surfaces and tortuous paths protected from abrasion and premature release of attached mineral particles. This provides for enhanced collection and increased functional durability. Spherical shaped recovery media, such as beads, and also of belts, and filters, is poor surface area to volume ratio—these media do not provide high surface area for maximum collection of mineral. Furthermore, certain media such as beads, belts and filters may be subject to rapid degradation of functionality.

Applying a functionalized polymer coating that promotes attachment of mineral to the foam "network" enables higher recovery rates and improved recovery of less liberated mineral when compared to the conventional process. This foam is open cell so it allows passage of fluid and particles smaller than the cell size but captures mineral bearing particles that come in contact with the functionalized polymer coating. Selection of cell size is dependent upon slurry properties and application.

A three-dimensional open cellular structure optimized to provide a compliant, tacky surface of low energy enhances collection of hydrophobic or hydrophobized mineral particles ranging widely in particle size. This structure may be comprised of open-cell foam coated with a compliant, tacky polymer of low surface energy. The foam may be comprised of reticulated polyurethane or another appropriate open-cell foam material such as silicone, polychloroprene, polyisocyanurate, polystyrene, polyolefin, polyvinylchloride, epoxy, latex, fluoropolymer, phenolic, EPDM, nitrile, composite foams and such. The coating may be a polysiloxane derivative such as polydimethylsiloxane and may be modified with tackifiers, plasticizers, crosslinking agents, chain transfer agents, chain extenders, adhesion promoters, aryl or alky copolymers, fluorinated copolymers, hydrophobizing agents such as hexamethyldisilazane, and/or inorganic particles such as silica or hydrophobic silica. Alternatively, the coating may be comprised of materials typically known as pressure sensitive adhesives, e.g. acrylics, butyl rubber, ethylene vinyl acetate, natural rubber, nitriles; styrene block copolymers with ethylene, propylene, and isoprene; polyurethanes, and polyvinyl ethers as long as they are formulated to be compliant and tacky with low surface energy.

The three-dimensional open cellular structure may be coated with a primer or other adhesion agent to promote adhesion of the outer collection coating to the underlying structure.

In addition to soft polymeric foams, other three-dimensional open cellular structures such as hard plastics, ceramics, carbon fiber, and metals may be used. Examples include metal and ceramic foams and porous hard plastics such as polypropylene honeycombs and such. These structures must be similarly optimized to provide a compliant, tacky surface of low energy by coating as above.

The three-dimensional, open cellular structures above may be coated or may be directly reacted to form a compliant, tacky surface of low energy.

The three-dimensional, open cellular structure may itself form a compliant, tacky surface of low energy by, for example, forming such a structure directly from the coating polymers as described above. This is accomplished through methods of forming open-cell polymeric foams known to the art.

The structure may be in the form of sheets, cubes, spheres, or other shapes as well as densities (described by pores per inch and pore size distribution), and levels of tortuosity that optimize surface access, surface area, mineral attachment/detachment kinetics, and durability. These structures may be additionally optimized to target certain mineral particle size ranges, with denser structures acquiring smaller particle sizes. In general, cellular densities may range from 10-200 pores per inch, more preferably 30-90 pores per inch, and most preferably 30-60 pores per inch.

The specific shape or form of the structure may be selected for optimum performance for a specific application. For example, the structure (coated foam for example) may be cut in a variety of shapes and forms. For example, a polymer coated foam belt could be moved through the slurry removing the desired mineral whereby it is cleaned and reintroduced into the slurry. Strips, blocks, and/or sheets of coated foam of varying size could also be used where they are randomly mixed along with the slurry in a mixing cell. Alternatively, a conveyor structure may be formed where the foam is encased in a cage structure that allows a mineral-containing slurry to pass through the cage structure to be introduced to the underlying foam structure where the mineral can react with the foam and thereafter be further processed in accordance with the present invention. The thickness and cell size could be changed to a form cartridge like filter whereby the filter is removed, cleaned of recovered minerals, and reused.

The Hydrophobic Engineered Media

By way of example, the hydrophobic engineered media may include, or take the form of, engineered polymeric beads/bubbles made from a synthetic material, e.g., having plurality of molecules with a siloxane functional group configured to attract the mineral particles of interest, including a molybdenum concentrate.

Alternatively, the synthetic material may include a coating with the plurality of molecules with the siloxane functional group configured to attract the mineral particles of interest, including a molybdenum concentrate.

By way of example, the coating may include a silicone gel that includes, or takes the form of, molecules having the siloxane functional group, including a siloxane that is, or takes the form of, a functional group in organosilicon chemistry with the Si—O—Si linkage.

Parent siloxanes may include, or take the form of, oligomeric and polymeric hydrides with the formulae $H(OSiH_2)_nOH$ and $(OSiH_2)_n$.

The siloxane may include branched compounds, where the defining feature includes each pair of silicon centers being separated by one oxygen atom.

The silicone gel may take the form of a product sold in a combination that includes 3-4222 Dielectric Firm Gel Part A and 3-4222 Dielectric Firm Gel Part B.

The silicone gel may come with two parts, including:

Part A that includes dimethyl siloxane, dimethylvinyl-terminated—68083-19-2; polydimethylsiloxane—63148-62-9; reaction of ethylene glycol and silica—170424-65-4; hydrotreated light naphthenic petroleum distillate—64742-53-6; and Part B that includes dimethyl siloxane, dimethylvinyl-terminated—68083-19-2; polydimethylsiloxane—63148-62-9; dimethyl siloxane, hydrogen-terminated—none; trimethylated silica—68909-20-6; dimethyl, methylhydrogen siloxane—68037-59-2.

The coating may be configured or made substantially of a material that consists of a siloxane-based material in a non-gel form.

The coating may be functionalized to be hydrophobic so as to provide a bonding between the coating and the mineral particle of interest.

The engineered polymeric hydrophobic media may include, or take the form of, engineered polymeric beads/bubbles, e.g., having surfaces made of a polymer and coated with a silicone gel to provide the siloxane functional group.

The polymer may be naturally hydrophobic or functionalized to be hydrophobic.

The polymer may be a hydrophobic polymer, including a polydimethylsiloxane.

The surfaces may be rendered hydrophobic by having chemicals with a siloxane functional group.

The coating may be coated with hydrophobic silicone polymer including polysiloxane so as to become hydrophobic.

The coating may include polymer surfaces and the synthetic material comprise a siloxane derivative.

The synthetic material may include polysiloxanes.

The synthetic material may include one or more of dimethyl siloxane, dimethylvinyl-terminated; polydimethylsiloxane; and dimethyl, methylhydrogen siloxane.

The synthetic material may include hydroxyl-terminated polydimethylsiloxanes.

The polymer surfaces may include polyurethane.

The coating may include a polymer selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane.

The coating may include a polymer from a group consisting of polystyrene, poly(d,l-lactide), poly(dimethylsiloxane), polypropylene, polyacrylic, polyethylene, hydrophobically-modified ethyl hydroxyethyl cellulose polysiloxanes, alkylsilane and fluoroalkylsilane.

The Related Family

This application is related to a family of applications, including at least the following:

This application is related to a family of nine PCT applications, which were all concurrently filed on 25 May 2012, as follows:

PCT application no. PCT/US12/39528, entitled "Flotation separation using lightweight synthetic bubbles and beads;"

PCT application no. PCT/US12/39524, entitled "Mineral separation using functionalized polymer membranes;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest;"

PCT application no. PCT/US12/39591, entitled "Method and system for releasing mineral from synthetic bubbles and beads;" PCT application no. PCT/US12/39596, entitled "Synthetic bubbles and beads having hydrophobic surface;"

PCT application no. PCT/US12/39631, entitled "Mineral separation using functionalized filters and membranes;

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column,"

all of which are incorporated by reference in their entirety.

This application also related to PCT application no. PCT/US13/28303, filed 28 Feb. 2013, entitled "Method and system for flotation separation in a magnetically controllable and steerable foam," which is also hereby incorporated by reference in its entirety.

This application also related to PCT application no. PCT/US13/42202, filed 22 May 2013, entitled "Charged engineered polymer beads/bubbles functionalized with molecules for attracting and attaching to mineral particles of interest for flotation separation," which is also hereby incorporated by reference in its entirety.

This application also related to PCT application no. PCT/US14/37823, filed 13 May 2014, entitled "Polymer surfaces having siloxane functional group," which claims benefit to U.S. patent application Ser. No. 14/890,477, filed 11 Nov. 2014, which is also hereby incorporated by reference in its entirety.

This application also related to PCT application no. PCT/US13/73855, filed 9 Dec. 2013, entitled "Techniques for agglomerating mature fine tailing by injecting a polymer in a process flow," which is also hereby incorporated by reference in its entirety.

This application also related to PCT application no. PCT/US15/33485, filed 1 Jun. 2015, entitled "Mineral recovery using hydrophobic polymer surfaces," which is also hereby incorporated by reference in its entirety.

This application also related to PCT application no. PCT/US15/66390, filed 17 Dec. 2015, entitled "Transportable modular system for enhanced mineral recovery from tailings lines and deposits," which is also hereby incorporated by reference in its entirety.

The Scope of the Invention

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow).

Although the invention has been described and illustrated with respect to exemplary embodiments thereof, the foregoing and various other additions and omissions may be made therein and thereto without departing from the spirit and scope of the present invention.

What is claimed is:

1. A copper/molybdenum processing system comprising a roughing circuit and
a cleaning circuit, wherein the roughing circuit comprises a sulfide separation stage arranged to receive a slurry comprising a ground ore product and sea water, the ground ore product comprising copper sulfide minerals and molybdenum sulfide minerals, wherein the cleaning circuit comprises a copper/molybdenum separation stage arranged to receive a bulk sulfide concentrate mixed with desalinated water, the bulk sulfide concentrate comprising the copper minerals and the molybdenum minerals recovered in the roughing circuit, wherein the ground ore product also comprises unwanted materials, and wherein the roughing circuit further comprises a comminution stage for comminuting an ore material and the sea water and to form the ground ore product in the slurry, and the sulfide separation stage separates a processed slurry containing said bulk sulfide concentrate which is sent to the cleaning circuit and separately discharges at least part of the unwanted materials as a gangue fraction, and wherein the cleaning circuit further comprises a regrinding stage arranged to receive the processed slurry, the processed slurry comprising the copper sulfide minerals and the molybdenum sulfide minerals recovered in the roughing circuit, the regrinding stage grinds the processed slurry to form a reground ore product containing said copper and molybdenum minerals which are sent to a cleaner flotation stage, the reground ore product comprising high pyrite tails and the bulk sulfide concentrate, the cleaner flotation stage separates the high pyrite tails as a separate fraction from a bulk mineral concentrate comprising said copper and molybdenum minerals, a bulk concentrate thickener which receives the bulk mineral concentrate forms a conditioned pulp containing the thickened bulk concentrate, a line connecting the conditioned pulp to the copper/molybdenum separation stage, and a source of engineered media functionalized to be hydrophobic comprises hydrophobic engineered media, and wherein the conditioned pulp contains hydrophobic molybdenum minerals and hydrophilic copper minerals that is conditioned with sodium hydrosulfide, and the copper/molybdenum separation stage comprises
a slurry/media mixture stage which receives the conditioned pulp together with the hydrophobic engineered media loaded with the hydrophobic molybdenum minerals, and forms a slurry/media mixture; and
a slurry/media separation stage which receives the slurry/media mixture, and separates a slurry product having a copper concentrate from the hydrophobic engineered media loaded with the hydrophobic molybdenum minerals, wherein the slurry/media separation stage comprises a media recovery stage, the media recovery stage comprises a vibrating screen, rotating trommel, or other separation device, for filtering, separating and directing a copper concentrate to a copper concentrate filtration stage from a hydrophobic media product comprising the hydrophobic engineered media loaded with hydrophobic molybdenum minerals and residual hydrophobic particles which are sent to a media wash stage, wherein the media wash stage washes the hydrophobic engineered media containing the hydrophobic minerals with a wash solution to remove the residual hydrophobic particles from the engineered media and molybdenum minerals and directs the washed hydrophobic engineered media with the molybdenum minerals to a media stripping stage, and a recycle line to recycle the wash solution returns the wash solution, containing the residual hydrophilic particles, to the bulk concentrate thickener stage.

2. The system according to claim 1, wherein the recovery stage is further configured to
receive the washed and stripped hydrophobic engineered media in the form of a slurried mixture of stripped engineered media, recovered hydrophobic engineered media from the molybdenum minerals and strip solution,
a recycle line to recycle recovered, washed and stripped hydrophobic engineered media to a molybdenite loading stage that forms part of the slurry/media mixture stage,
a preliminary filter for separating strip solution from a molybdenum concentrate containing said molybdenum minerals and directing the molybdenum concentrate to a moly filtration stage; and
a line to recycle recovered strip solution from the preliminary filter to the stripping stage.

3. The system according to claim 2, wherein the molybdenum filtration stage filters the molybdenum concentrate and forms filtered molybdenum concentrate.

* * * * *